United States Patent
Niitsuma

(10) Patent No.: US 8,659,768 B2
(45) Date of Patent: Feb. 25, 2014

(54) JOB PROCESSING DEVICE, CONTROL METHOD AND CONTROL PROGRAM THEREFOR

(75) Inventor: Hiroaki Niitsuma, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/264,773

(22) PCT Filed: Aug. 17, 2011

(86) PCT No.: PCT/JP2011/068994
§ 371 (c)(1),
(2), (4) Date: Oct. 17, 2011

(87) PCT Pub. No.: WO2012/063534
PCT Pub. Date: May 18, 2012

(65) Prior Publication Data
US 2012/0176635 A1    Jul. 12, 2012

(30) Foreign Application Priority Data
Aug. 19, 2010   (JP) .................................. 2010-184169

(51) Int. Cl.
*G06F 3/12*   (2006.01)
*G06F 3/00*   (2006.01)
*G06F 1/32*   (2006.01)

(52) U.S. Cl.
USPC ................................ 358/1.13; 710/8; 713/320

(58) Field of Classification Search
None
See application file for complete search history.

(56) References Cited

U.S. PATENT DOCUMENTS

| 5,477,340 A * | 12/1995 | Hasegawa | 358/438 |
| 2005/0149640 A1* | 7/2005 | Hosokawa | 710/8 |
| 2008/0239358 A1* | 10/2008 | Uno | 358/1.13 |
| 2010/0325455 A1* | 12/2010 | Odaguchi | 713/320 |
| 2011/0019762 A1* | 1/2011 | Tsubota | 375/295 |

FOREIGN PATENT DOCUMENTS

| JP | 2001-156822 A | 6/2001 |
| JP | 2007-172160 A | 7/2007 |
| JP | 2009-140483 A | 6/2009 |

OTHER PUBLICATIONS

International Search Report issued in WO counterpart application No. PCT/JP2011/068994, dated Nov. 29, 2011.

* cited by examiner

*Primary Examiner* — Twyler Haskins
*Assistant Examiner* — Henok Shiferaw
(74) *Attorney, Agent, or Firm* — Rossi, Kimms & McDowell LLP

(57) ABSTRACT

A job processing device capable of preventing a poor communication while keeping the sufficient communication speed. The job processing device is connected to a host, which has a host interface supporting a first connection mode for communicating in a first communication speed and a second connection mode for communicating in a second communication speed being slower, and processes a job transmitted from the host. A device interface has the first and second connection modes. A connection control means changes the device interface from the second connection mode to the first connection mode when the device interface is connected to the host interface in the second connection mode and when a first operation mode for processing a job is shifted to a second operation mode being lower in power consumption. A mode control means shifts to the second operation mode from the first operation mode after changing the connection mode.

15 Claims, 12 Drawing Sheets

HOST PC

PRINTER

JOB PROCESSING DEVICE, CONTROL METHOD AND CONTROL PROGRAM THEREFOR

This application is a U.S. National Phase Application of PCT International Application PCT/JP2011/068994 filed on Aug. 17, 2011 which is based on and claims priority from JP 2010-184169 filed on Aug. 19, 2010, the contents of which is incorporated herein in its entirety by reference.

TECHNICAL FIELD

The present invention relates to a job processing device, a control method and a control program therefor. Particularly, the present invention relates to a communication control of the job processing device that processes a job received from a host that is connected via an interface (I/F) like a Universal Serial Bus (USB).

BACKGROUND ART

Generally, the USB I/F is used to connect a USB host with a USB device and to communicate. For example, the USB I/F has spread as a general-purpose I/F that connects a personal computer (PC) as a host with a job processing device like an image forming apparatus (for example, a printer).

Incidentally, communication speeds supported by USB 2.0 are 1.5 Mbps in a low speed (LS) mode, 12 Mbps in a full speed (FS) mode, and 480 Mbps in a high speed (HS) mode. Then, the communication speed is determined according to types of a USB host and a USB device connected to the USB host.

Further, USB 3.0 supports a super speed (SS) mode of which the communication speed is accelerated to 5 Gbps. The SS mode does not only accelerate the communication speed, but also enables the USB device to control a shift to a low power consumption state in the USB I/F communication, which was conventionally possible only from the USB host. Therefore, the SS mode is more convenient for USB device that aims to save power consumption.

On the other hand, the higher communication speed unescapably increases probability of poor communication due to an effect of noise. This may disturb normal data transmission from the USB host normally.

Here, it is assumed that a USB device of the SS mode connection and a USB device of the HS mode connection are connected to a USB host supporting USB 3.0 via a USB hub supporting USB 3.0. In this case, a communication in the SS mode and a communication in the HS mode are performed concurrently between the USB host and the USB 3.0 hub.

Then, the concurrent communications in the SS mode and the HS mode generate crosstalk noise that becomes a new factor to disturb the communications.

In order to prevent the poor communication in the communication using the USB I/F, there is a known technique that detects the poor communication caused during the communications. The technique lowers communication speed to keep a stability of communication when detecting that the poor communication continues beyond a fixed time (for example, see PTL 1).

However, since the technique disclosed in PTL 1 changes the communication speed after detecting the poor communication, it is difficult to prevent the poor communication before changing the communication speed.

CITATION LIST

Patent Literature

PTL 1: Japanese Laid-Open Patent Publication (Kokai) No. 2007-172160 (JP 2007-172160A)

SUMMARY OF INVENTION

Technical Problem

The present invention provides a job processing device, a control method and a control program therefor, which is capable of preventing a poor communication by changing communication speed before a data communication while keeping the sufficient communication speed for the data communication.

Solution to Problem

Accordingly, a first aspect of the present invention provides a job processing device that is connected to a host, which has a host interface supporting a first connection mode for communicating in a first communication speed and a second connection mode for communicating in a second communication speed being slower than the first communication speed, and processes a job transmitted from the host, comprising a device interface that is provided with the first and second connection modes, a connection control means that changes the device interface from the second connection mode to the first connection mode when the device interface is connected to the host interface in the second connection mode and when an operation mode is shifted from a first operation mode for processing a job to a second operation mode being lower in power consumption than the first operation mode, and a mode control means that shifts the operation mode to the second operation mode from the first operation mode after changing the connection mode.

Accordingly, a second aspect of the present invention provides a job processing device that is connected to a host, which has a host interface supporting a first connection mode for communicating in a first communication speed and a second connection mode for communicating in a second communication speed being slower than the first communication speed, and processes a job transmitted from the host, comprising a device interface that is provided with the first and second connection modes, and a connection control means that sets the connection mode of the job processing device itself in the first connection mode when a mode determination result showing a connection mode of another job processing device to the host shows the first connection mode, and sets the connection mode of the job processing device itself in the second connection mode when the mode determination result shows the second connection mode.

Accordingly, a fifth aspect of the present invention provides a control method for a job processing device that is connected to a host, which has a host interface supporting a first connection mode for communicating in a first communication speed and a second connection mode for communicating in a second communication speed being slower than the first communication speed, has a device interface that is provided with the first and second connection modes, and processes a job transmitted from the host, the control method comprising a determination step of determining whether the device interface is connected to the host interface in the second connection mode, when an operation mode is shifted from a first operation mode for processing a job to a second operation mode being lower in power consumption than the first operation mode, a connection control step of changing the connection mode of the device interface to the first connection mode from the second connection mode when it is determined that the device interface is connected to the host interface in the second connection mode in the determination step, and a mode control step of shifting the operation mode to the second operation mode from the first operation mode after changing the connection mode.

Accordingly, a fourth aspect of the present invention provides a control method for a job processing device that is connected to a host, which has a host interface supporting a first connection mode for communicating in a first communication speed and a second connection mode for communicating in a second communication speed being slower than the first communication speed, has a device interface that is provided with the first and second connection modes, and processes a job transmitted from the host, the control method comprising a receiving step of receiving a mode determination result showing a connection mode of another job processing device connected to the host determined by the host, and a connection control step of setting a connection mode of the job processing device itself in the first connection mode when the mode determination result shows the first connection mode, and setting the connection mode of the job processing device itself in the second connection mode when the mode determination result shows the second connection mode.

Accordingly, a fourth aspect of the present invention provides a control program causing a computer to function as a job processing device that is connected to a host, which has a host interface supporting a first connection mode for communicating in a first communication speed and a second connection mode for communicating in a second communication speed being slower than the first communication speed, has a device interface that is provided with the first and second connection modes, and processes a job transmitted from the host, the control program comprising a determination step of determining whether the device interface is connected to the host interface in the second connection mode, when an operation mode is shifted from a first operation mode for processing a job to a second operation mode being lower in power consumption than the first operation mode, a connection control step of changing the connection mode of the device interface to the first connection mode from the second connection mode when it is determined that the device interface is connected to the host interface in the second connection mode in the determination step, and a mode control step of shifting the operation mode to the second operation mode from the first operation mode after changing the connection mode.

Accordingly, a sixth aspect of the present invention provides a control program causing a computer to function as a job processing device that is connected to a host, which has a host interface supporting a first connection mode for communicating in a first communication speed and a second connection mode for communicating in a second communication speed being slower than the first communication speed, has a device interface that is provided with the first and second connection modes, and processes a job transmitted from the host, the control program comprising a receiving step of receiving a mode determination result showing a connection mode of another job processing device connected to the host determined by the host, and a connection control step of setting a connection mode of the job processing device itself in the first connection mode when the mode determination result shows the first connection mode, and setting the connection mode of the job processing device itself in the second connection mode when the mode determination result shows the second connection mode.

Advantageous Effects of Invention

According to the present invention, since the connection mode is changed to the second connection mode that has less effect of noise before the data communication, the communication can be stable with less effect of noise. Further, the present invention can save the power consumption of the system that consists of the host and the job processing devices.

Further features of the present invention will become apparent from the following description of exemplary embodiments with reference to the attached drawings.

DESCRIPTION OF EMBODIMENTS

Hereafter, an example of a job processing device according to an embodiment of the present invention will be described with reference to the attached drawings.

Figure 1:
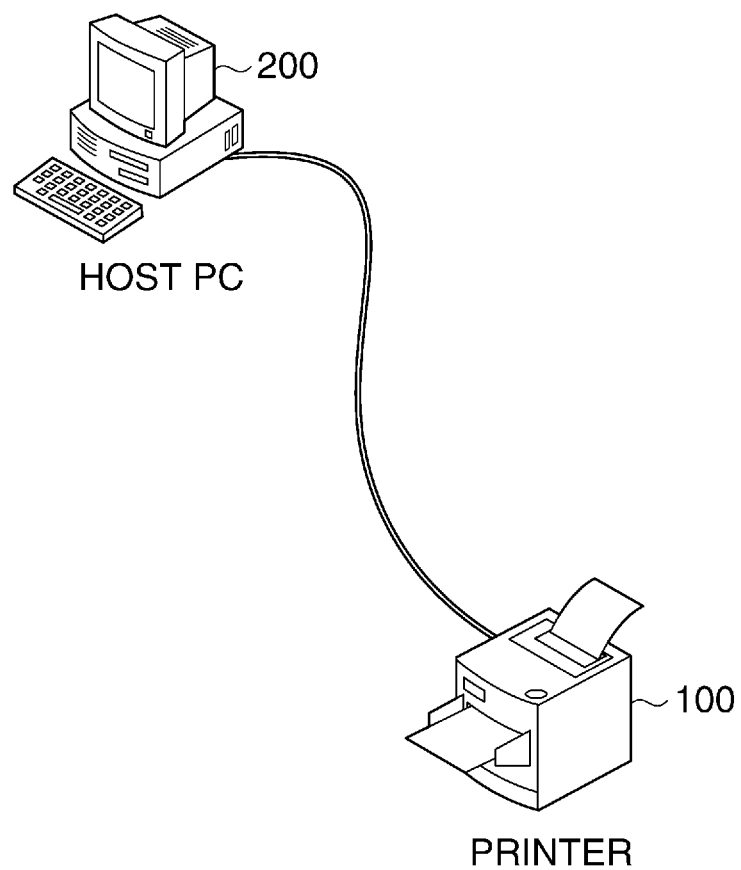
FIG. 1 is a view showing an example of a printing system that uses a printer as a job processing device according to a first embodiment of the present invention.

FIG. 1 is a view showing an example of a printing system that uses a printer as a job processing device according to a first embodiment of the present invention.

As shown in FIG. 1, in the illustrated printing system, a host PC 200 as a USB host and a printer 100 as a USB device (a job processing device) are connected via a USB I/F (interface). It should be noted that the host PC 200 that supports USB 3.0 and has a USB 3.0 interface (host interface). Similarly, the printer 100 also supports USB 3.0.

The host PC 200 is a general PC. Various kinds of application software are executed on an OS (operating system) of the host PC 200.

A printer driver for controlling the printer 100 has been installed in the host PC 200. Then, when a user selects a printing process on application software in the host PC 200, the printer driver generates a print job and transmits it to the printer 100 via the USB I/F. Here, the print job that the printer driver generates is a print command that defines an image outputted from the printer called a PDL (Page Description Language), for example. The print job is generated by compressing a raster image generated on the host PC 200. Then, when receiving the print job from the host PC 200, the printer 100 executes a printing process according to contents of the received print job.

Figure 2:
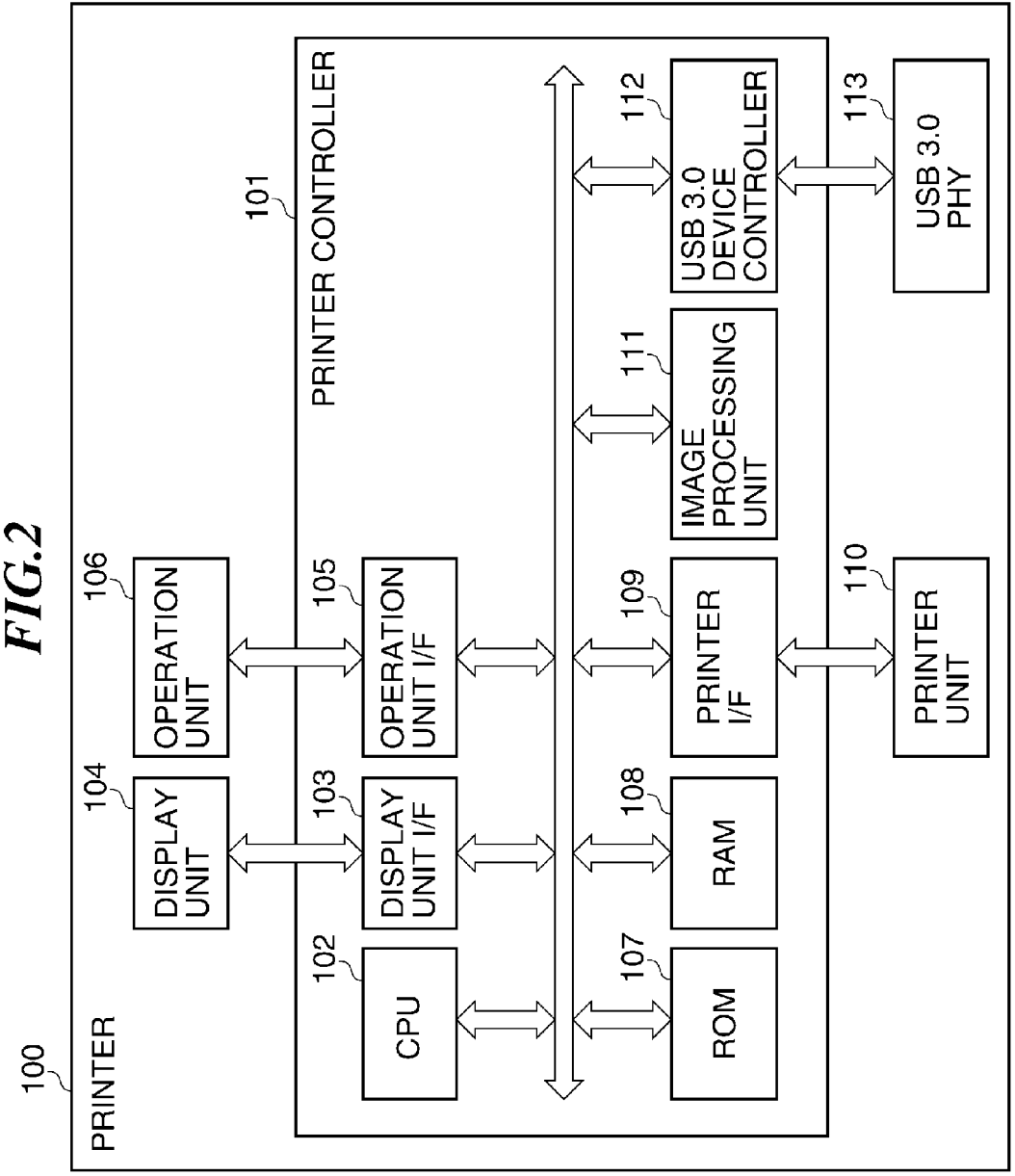
FIG. 2 is a block diagram schematically showing an example of the configuration of the printer shown in FIG. 1.

FIG. 2 is a block diagram showing an example of the configuration of the printer 100 shown in FIG. 1.

As shown in FIG. 2, the printer 100 has a printer controller 101 that executes an image process required for the printing process and controls the entire printer. In the illustrated example, a display unit 104 and an operation unit 106 are connected to the printer controller 101, and a printer unit 110 is also connected. The printer controller 101 is connected to the host PC 200 (FIG. 1) via a USB 3.0 PHY (physical interface) 113.

The printer controller 101 has a CPU 102, a display unit interface (I/F) 103, an operation unit I/F 105, a ROM 107, a RAM 108, a printer I/F 109, an image processing unit 111, and a USB 3.0 device controller (it is only called a device controller) 112.

The CPU 102 operates according to a control program stored in the ROM 107 to process a print job, etc. The CPU 102 is a processor that controls the entire printer, and controls various processes performed by the printer controller 101.

The RAM 108 is a system work memory for the CPU 102 to operate, and is also used as an image memory for storing image data for printing temporarily. The ROM 107 is a boot ROM and is a nonvolatile memory in which a boot program is stored.

The display unit I/F 103 is an interface that transmits or receives a command and data to or from the display unit 104. The display unit 104 comprises an LCD (a liquid crystal display), and displays a current status of the printer 100, user's set information, etc., for example. The operation unit I/F 105 transmits or receives a command and data to or from the operation unit 106. The operation unit 106 comprises a hardkey etc. and receives the input instruction from a user.

The CPU 102 controls an operation of the printer 100 according to an input instruction that the operation unit 106 received. The device controller 112 controls a communication of USB 3.0, and is connected to the host PC 200 via the above-mentioned USB 3.0 PHY 113. The USB I/F (device interface) is specified by the device controller 112 and the USB 3.0 PHY 113. Then, a print job, various status information, and a control signal are exchanged between the host PC 200 and the printer 100 via the USB I/F.

The image processing unit 111 performs an image processing for a print output to the image data for a print, and transmits printing data to the printer unit 110 connected via the printer I/F 109. The printer unit 110 prints an image on a sheet based on the received printing data.

The printer unit 110 employs an electrophotography process that fixes toner onto a sheet to form an image using a photoconductive drum or a photo conductor belt, for example.

The illustrated printer 100 has a normal working state (a normal state, a normal mode), and a sleep working state (a sleep state, a sleep mode) in which power consumption is lower than that in the normal working state. For example, the CPU 102, the display unit I/F 103, the display unit 104, the printer I/F 109, the printer unit 110, the image processing unit 111, and the device controller 112, which are shown in FIG. 2, are not energized in the sleep state. This shifts the printer to a low power consumption state as a whole.

Thus, the power supplied to the power-off section of the printer 100 is stopped in the sleep state. In the sleep state, the supply of clock used to operate a digital circuit is stopped. This reduces the power consumption in the printer 100.

In addition, the illustrated printer 100 shifts the USB connection in the SS mode with the host PC 200 to a power down state, and shifts to the lower power consumption state while keeping the USB connections to the host PC 200. Since the SS mode supported by USB 3.0 achieves the high transfer speed as mentioned above and does not require the host side to check until the device side transmits an Endpoint Ready Packet, it can reduce the power consumption of the system.

The printer 100 shifts to the sleep state from the normal state when a fixed time elapses without any actions of the printer 100, or when a user's instruction is received via the operation unit 106, for example. Then, the printer 100 returns to the normal state from the sleep state when the print job is received in the sleep state and will start printing, or when a user's instruction is received via the operation unit 106.

Specifically, the operation unit I/F 105 interrupts the CPU 102 according to an input instruction received via the operation unit 106. As mentioned above, when the CPU 102 that is working in the low power consumption mode receives the interruption, the CPU 102 returns to a normal operation mode.

Next, the CPU 102 that returned to the normal operation mode performs the process that returns each section of the printer 100 from the sleep state to the normal state. When the host PC 200 executes a print job while the printer 100 is in the sleep state, the USB connection with the printer 100 in the SS mode is exited from the power down state. At this time, the device controller 112 detects the exit from the power down state in the printer 100, and the CPU 102 is interrupted to return from the sleep state in the same manner as mentioned above.

Thus, the printer 100 saves the power consumption by selecting a suitable mode from the modes that are different in the power consumption according to the operation situation thereof.

It should be noted that this embodiment shall supply the electric power to all the hardware modules shown in FIG. 2 in the normal state, but shall supply to a part of the hardware modules in the sleep state. However, the power supplying control is not limited to the embodiment. For example, the supply of electric power to apart of the hardware modules shown in FIG. 2 may be stopped even in the normal state. Supply of electric power to a part other than the above-mentioned power-off section may be stopped, or the electric power may be supplied to a part of the power-off section. Namely, the normal state is in the condition where the power consumption of the entire printer is higher than the sleep state, and the sleep state is in the condition where the power consumption of the entire printer is lower than the normal state.

Figure 3:
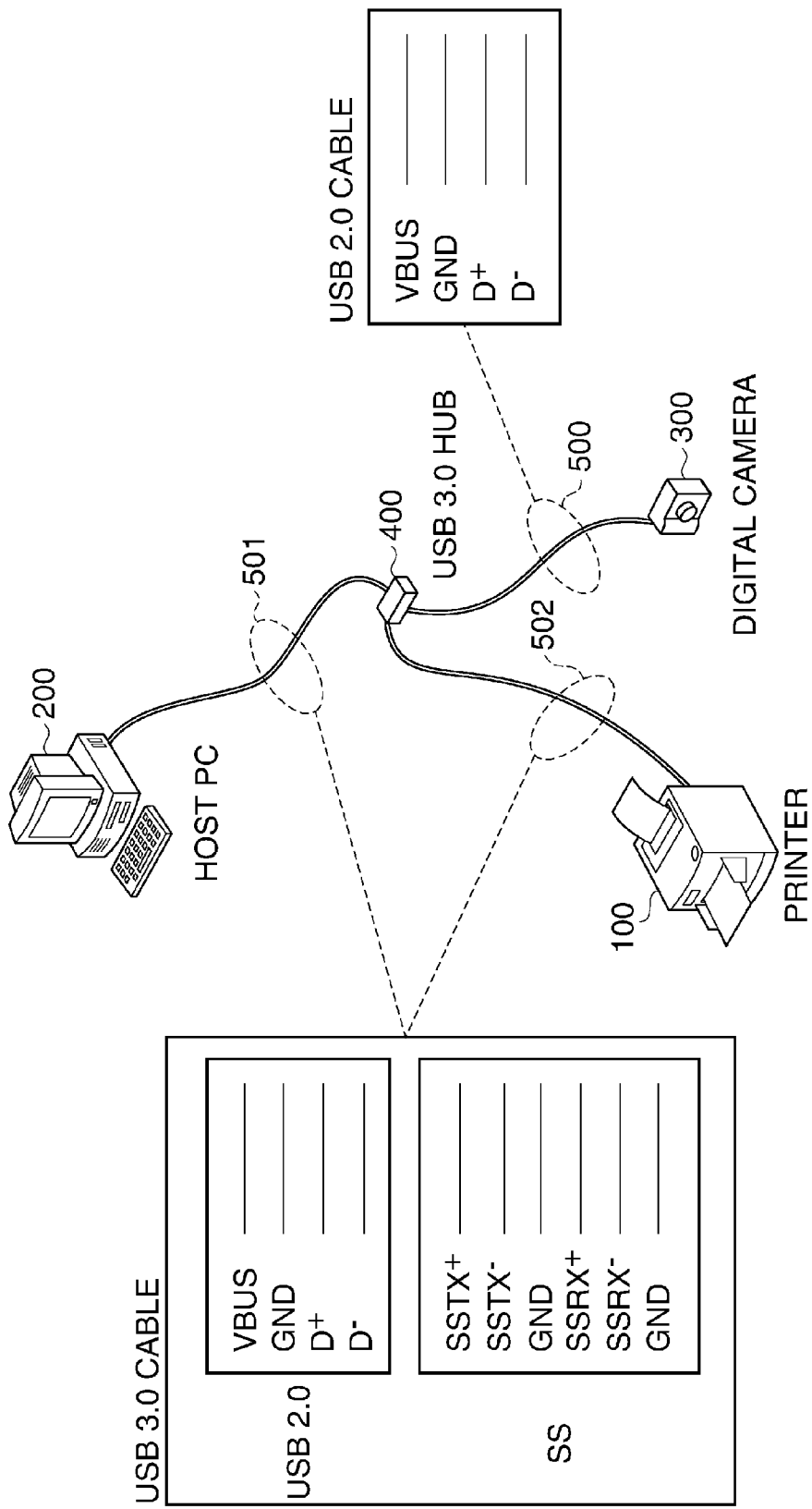
FIG. 3 is a view showing another example of a printing system that uses the printer shown in FIG. 2.

FIG. 3 is a view showing another example of printing system that uses the printer 100 shown in FIG. 2.

In the example shown in FIG. 3, a USB 3.0 hub (it is only called a hub hereafter) 400 is included in addition to the host PC 200 and the printer 100. The host PC 200 and the printer 100 are connected via the hub 400 concerned. The digital camera 300, which is a USB 2.0 device, is connected with the host PC 200 via the hub 400. It should be noted that the hub 400 relays a USB host and a USB device.

As shown in FIG. 3, the hub 400 and the digital camera 300 are connected by a USB 2.0 cable 500, and the hub 400 and the host PC 200 are connected by a USB 3.0 cable 501. The hub 400 and the printer 100 are connected by a USB 3.0 cable 502.

The USB 2.0 cable 500 comprises four signal lines of VBUS, GND, D+, and D−, and is used for connections in an HS (High Speed) mode, an FS (Full Speed) mode, and a LS (Low Speed) mode. On the other hand, each of the USB 3.0 cables 501 and 502 comprises ten signal lines that include four signal lines, which are common to the USB 2.0 cable 500 used for the connections in the HS (high speed: a second communication speed) mode, the FS and LS modes (second connection modes), and six signal lines of SSTX+, SSTX−, SSRX+, SSRX−, and two GNDs, which are used for a connection in the SS (super speed: a first communication speed) mode (a first connection mode). Therefore, the connecting configurations between the host PC 200, the hub 400, the printer 100, and the digital camera 300 in the printing system shown in FIG. 3 are as shown in FIG. 4.

Figure 4:
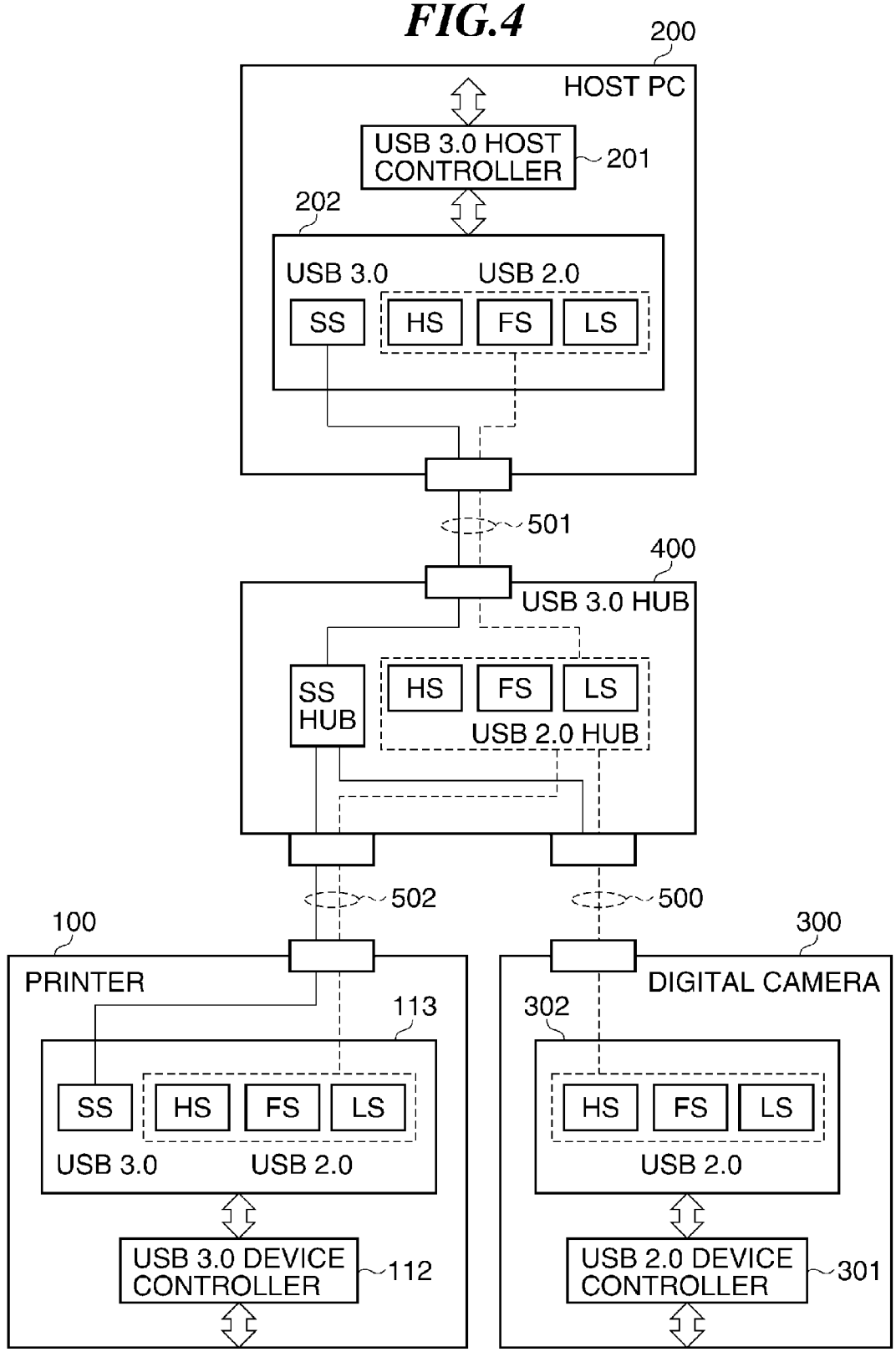
FIG. 4 is a view showing USB I/F connections between a host PC, a hub, a printer, and a digital camera that are shown in FIG. 3.

FIG. 4 is a view showing the USB I/F connections between the host PC 200, the hub 400, the printer 100, and the digital camera 300 that are shown in FIG. 3.

In FIG. 4, the host PC 200 has a USB 3.0 host controller 201 and a USB 3.0 PHY (physical interface) 202. The USB 3.0 host controller 201 controls a communication in USB 3.0. The USB 3.0 host controller 201 communicates with a USB device in the SS, HS, FS, or LS mode via the USB 3.0 PHY 202 to which the USB 3.0 cable 501 is connected.

The host PC 200 communicates with a USB device to which the USB 3.0 host controller 201 is connected by outputting and inputting data via the host PC internal bus (not shown).

The digital camera 300 has a USB 2.0 device controller 301 and a USB 2.0 PHY 302. The USB 2.0 device controller 301 controls a communication in USB 2.0. The USB 2.0 device controller 301 communicates with a USB host in the HS, FS, or LS mode via the USB 2.0 PHY 302 to which the USB 2.0 cable 500 is connected.

The digital camera 300 communicates with a USB host to which the USB 2.0 device controller 301 is connected by outputting and inputting data between the USB host and an internal bus (not shown) of the digital camera.

Although the digital camera 300 is illustrated as the USB 2.0 device as an example, the USB 2.0 device is not limited to the digital camera.

As shown in FIG. 4, each of the USB 3.0 PHY 202 of the host PC 200 and the USB 3.0 PHY 113 of the printer 100 that support USB 3.0 have an SS mode supporting unit, and HS, FS, and LS mode supporting units in parallel so as to correspond to each of the USB 3.0 cables 501 and 502.

On the other hand, the USB 2.0 PHY 302 of the digital camera 300 that supports up to USB 2.0 has the HS, FS, and LS mode supporting units only. A connection between a USB host and a USB device is detected by termination of a receiving unit in the SS mode, and is detected by pull-up of D+ or D− in the HS, FS, or LS mode.

The USB 3.0 device is connectable by either of the USB 2.0 cable 500 and the USB 3.0 cable 502. The detected result mentioned above determines whether the connecting configuration is in the SS mode, or the HS, FS or LS mode.

As mentioned above, the hub 400 is connected with the digital camera 300 using the USB 2.0 cable 500, and the connecting configuration between the hub 400 and the digital camera 300 is in the HS mode. The hub 400 is connected with the printer 100 using the USB 3.0 cable 502, and the connecting configuration between the hub 400 and the printer 100 is in the SS mode. Then, the host PC 200 and the hub 400 are connected by the USB 3.0 cable 501, and the hub 400 relays the SS mode connection between the printer 100 and the host PC 200. The hub 400 also relays the HS mode connection between the digital camera 300 and the host PC 200.

Thus, when the job processing devices are connected to the hub 400 in the SS mode and the HS, FS, or LS mode, the communication in the HS, FS, or LS mode and the communication in the high-speed SS mode are performed in concurrency between the host PC 200 and the hub 400. Therefore, the crosstalk noise produced in the concurrency communications becomes a factor that deteriorates the communication quality.

Particularly, the influence of the crosstalk noise on the communication quality becomes larger in the connection in the SS mode that allows higher speed communication. In the SS mode, when the USB device sends a power-down request to the USB host, the connecting condition under which the power consumption is lower than that in the HS, FS, or LS mode is achieved.

Figure 5:
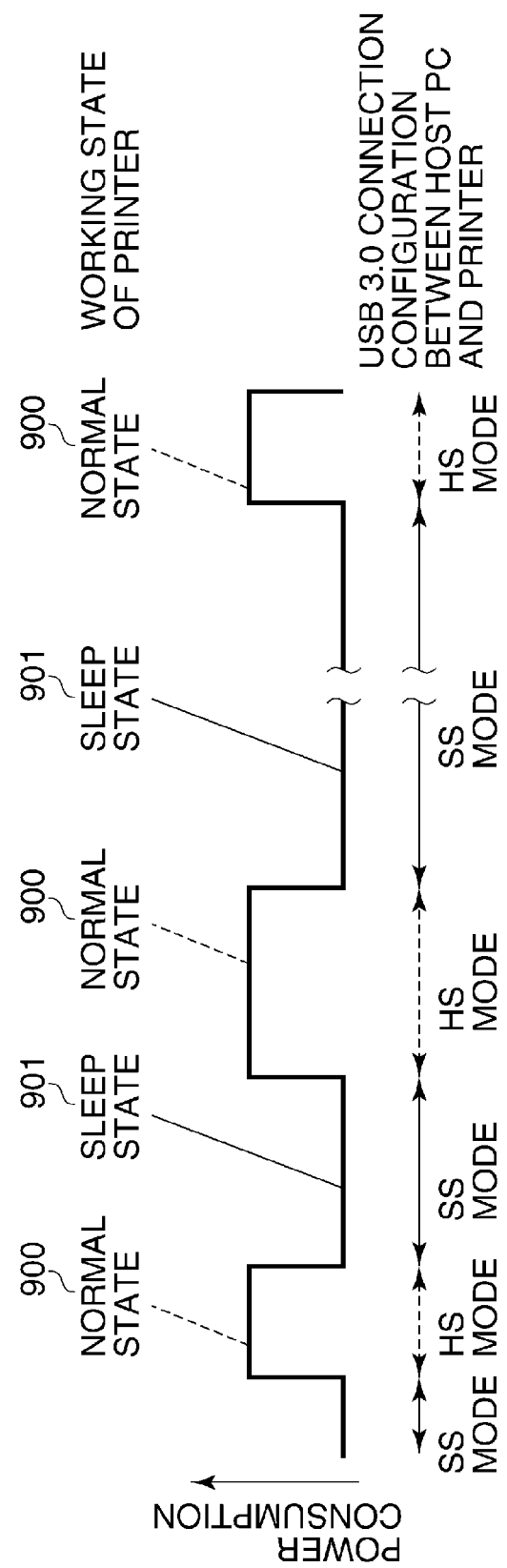
FIG. 5 is a view showing relations among a working state of the printer shown in FIG. 2, a connecting configuration of USB I/F, and power consumption.

FIG. 5 is a view showing relations among a working state of the printer 100 shown in FIG. 2, a connecting configuration of USB I/F, and power consumption.

In the illustrated example, when the printer 100 is in the normal state 900, the CPU 102 controls the device controller 112 so that the printer 100 is connected to the host PC 200 in the HS mode and communicates in order to stabilize the communication. On the other hand, when the printer 100 is in the sleep state 901, the CPU 102 controls the device controller 112 so that the printer 100 is connected to the host PC 200 in the SS mode in order to reduce the power consumption.

Here, the communication speed in the HS mode is sufficient to perform the printing process by the printer 100. The larger the ratio of the sleep state occupied in the working time of the printer is, the lower the power consumption is.

Figure 6:
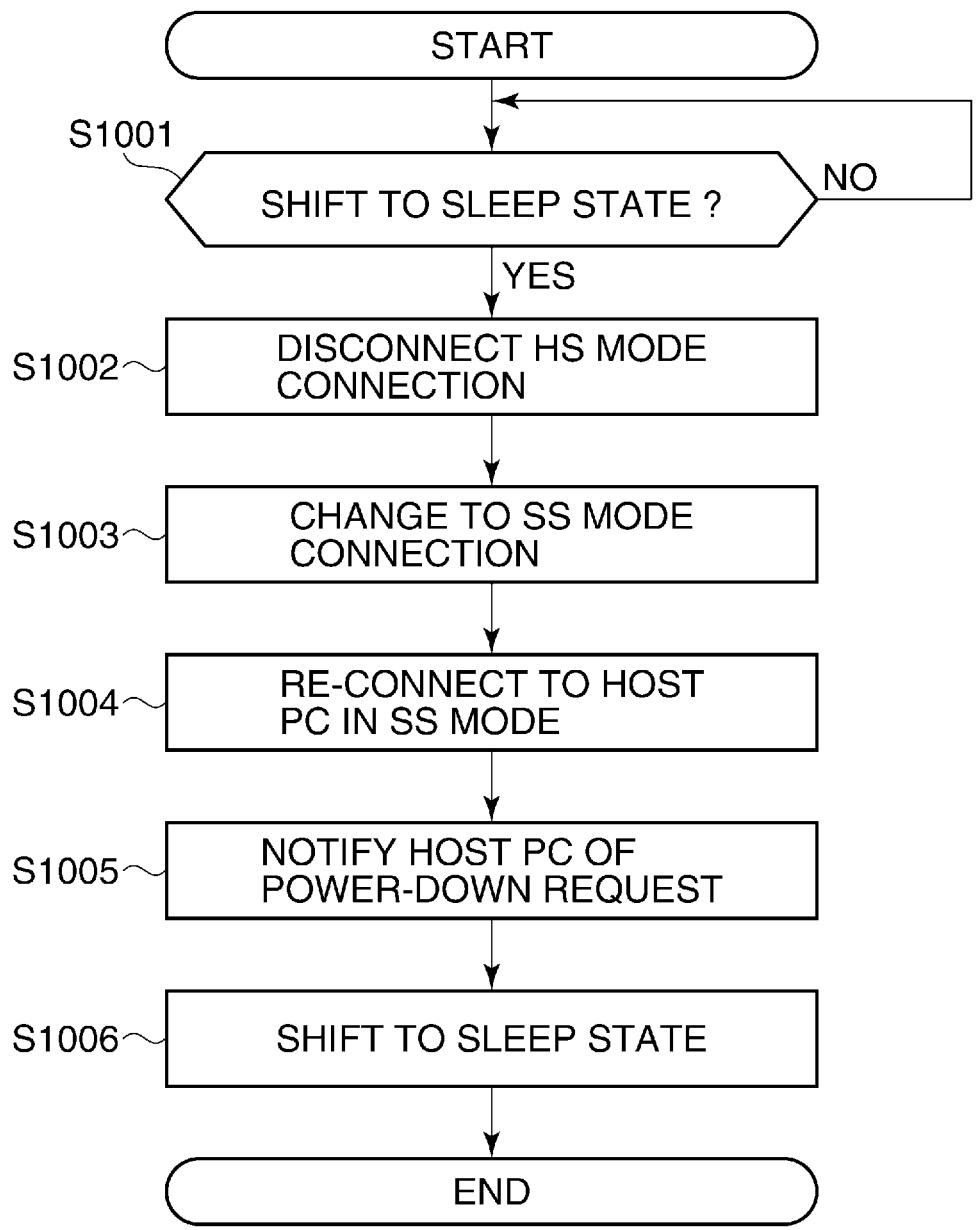
FIG. 6 is a flowchart showing a procedure executed when the printer shown in FIG. 2 is shifted from a normal state to a sleep state.

FIG. 6 is a flowchart showing a procedure executed when the printer 100 shown in FIG. 2 is shifted from the normal state to the sleep state.

In the following description, the USB I/F of the printer 100 shall be connected to the host PC 200 in the HS mode, and the printer 100 shall be working in the normal state 900.

In the above-mentioned condition, the CPU 102 determines whether the printer 100 shifts to the sleep state 901 from the normal state 900 (step S1001). For example, when standby time in which the printer 100 does not execute a printing process etc. becomes larger than a predetermined time that has been set by a user beforehand, the CPU 102 determines to shift to the sleep state 901 from the normal state 900. When a user instructs to shift to the sleep state 901 from the normal state 900 through the operation unit 106, the CPU 102 determines to shift to the sleep state 901 from the normal state 900.

When determining that the printer does not shift to the sleep state 901 (NO in the step S1001), the CPU 201 enters in the standby condition. On the other hand, when determining that the printer shifts to the sleep state 901 (YES in the step S1001), the CPU 102 controls the device controller 112 so as to disconnect the HS mode connection established by the USB I/F (step S1002). When the connection is disconnected, the pull-up of D+ detected by the host PC 200 is changed by a switch, for example.

Next, the CPU 102 controls the device controller 112 so as to connect the USB I/F to the host PC 200 in the SS mode (step S1003). When the mode is changed to the SS mode, the termination is changed by the switch so that the host PC 200 enables to detect the termination, for example.

This makes the printer 100 be connectable to the USB I/F in the SS mode, and the printer 100 is connected to the host PC 200 in the SS mode (step S1004).

Next, the CPU 102 notifies the host PC 200 of the power-down request in the SS mode (step S1005). Then, the CPU 102 makes the printer 100 shift to the sleep state in the SS mode connection (step S1006), and finishes a process.

Figure 7:
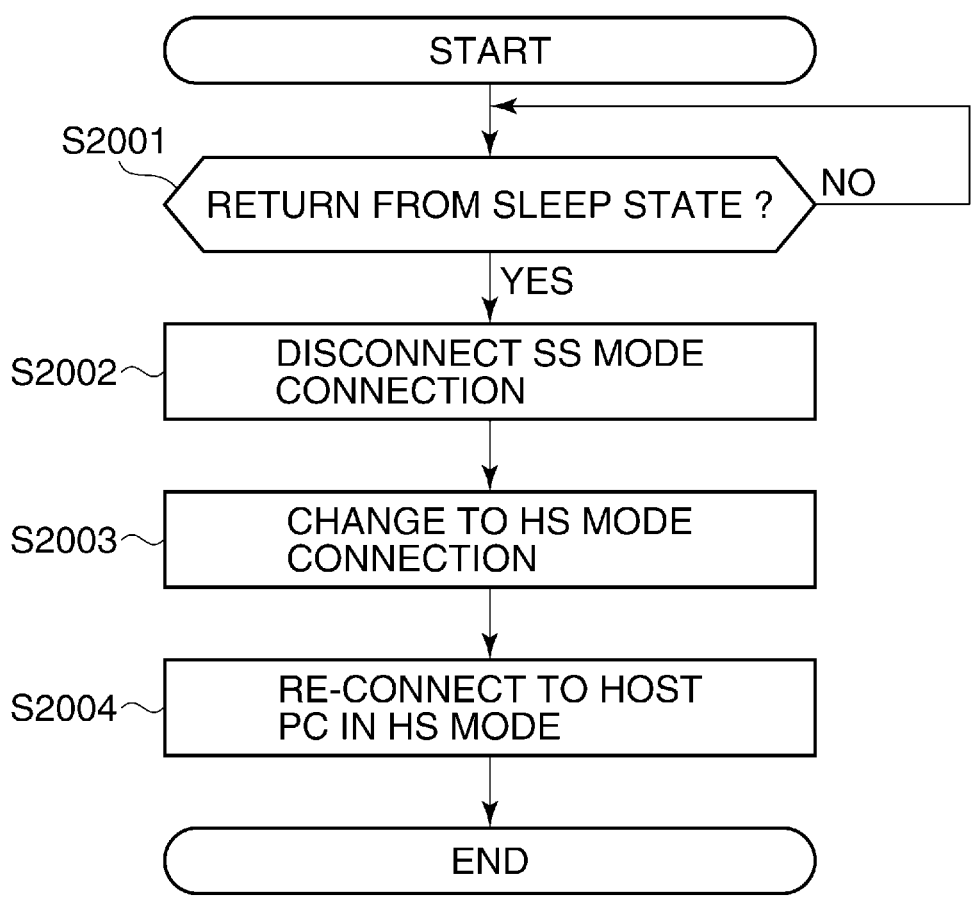
FIG. 7 is a flowchart showing a procedure executed when the printer shown in FIG. 2 returns to the normal state from the sleep state.

FIG. 7 is a flowchart showing a procedure executed when the printer 100 shown in FIG. 2 returns to the normal state from the sleep state.

Here, the USB I/F of the printer 100 shall be connected to the host PC 200 in the SS mode, and the printer 100 shall be in the sleep state 901.

In the above-mentioned condition, the CPU 102 determines whether the printer 100 returns to the normal state 900 from the sleep state 901 (step S2001). For example, when detecting a change of the connecting condition in the SS mode, the CPU 102 determines to return to the normal state 900 from the sleep state 901. When a user instructs to return to the normal state 900 from the sleep state 901 through the operation unit 106, the CPU 102 determines to return to the normal state 900 from the sleep state 901.

The change of the connecting condition in the SS mode means that the host PC 200 shifts to the normal state from the sleep state in the SS mode in order to transmit a print job to the printer 100.

When determining that the printer does not return to the normal state 900 (NO in the step S2001), the CPU 201 enters in the standby condition. On the other hand, when determining that the printer returns to the normal state 900 (YES in the step S2001), the CPU 102 controls the device controller 112 so as to disconnect the SS mode connection established by the USB I/F (step S2002). When the connection is disconnected, the termination detected by the host PC 200 is changed by a switch, for example.

Next, the CPU 102 controls the device controller 112 so as to connect the USB I/F to the host PC 200 in the HS mode (step S2003). When the mode is changed to the HS mode, the HS mode connection starts when the host PC 200 does not detect the termination while keeping the termination in the changed state by the switch, for example.

This makes the USB I/F of the printer 100 establish the connection with the host PC 200 in the HS mode (step S2004). And the CPU 102 finishes the process.

As mentioned above, when a print job is executed in the first embodiment, since the connection is changed from the SS mode (super speed mode) to the HS mode (high speed mode) with less influence in a noise before the printer 100 receives the print job, the influence of a noise decreases, and a print job can be received with stability.

When a print job is not executed, the connection mode between the host PC 200 and the printer 100 is shifted to the SS mode and the printer 100 is in the sleep state that is low in the power consumption. This achieves the power-saving of the printing system itself.

Figure 8:
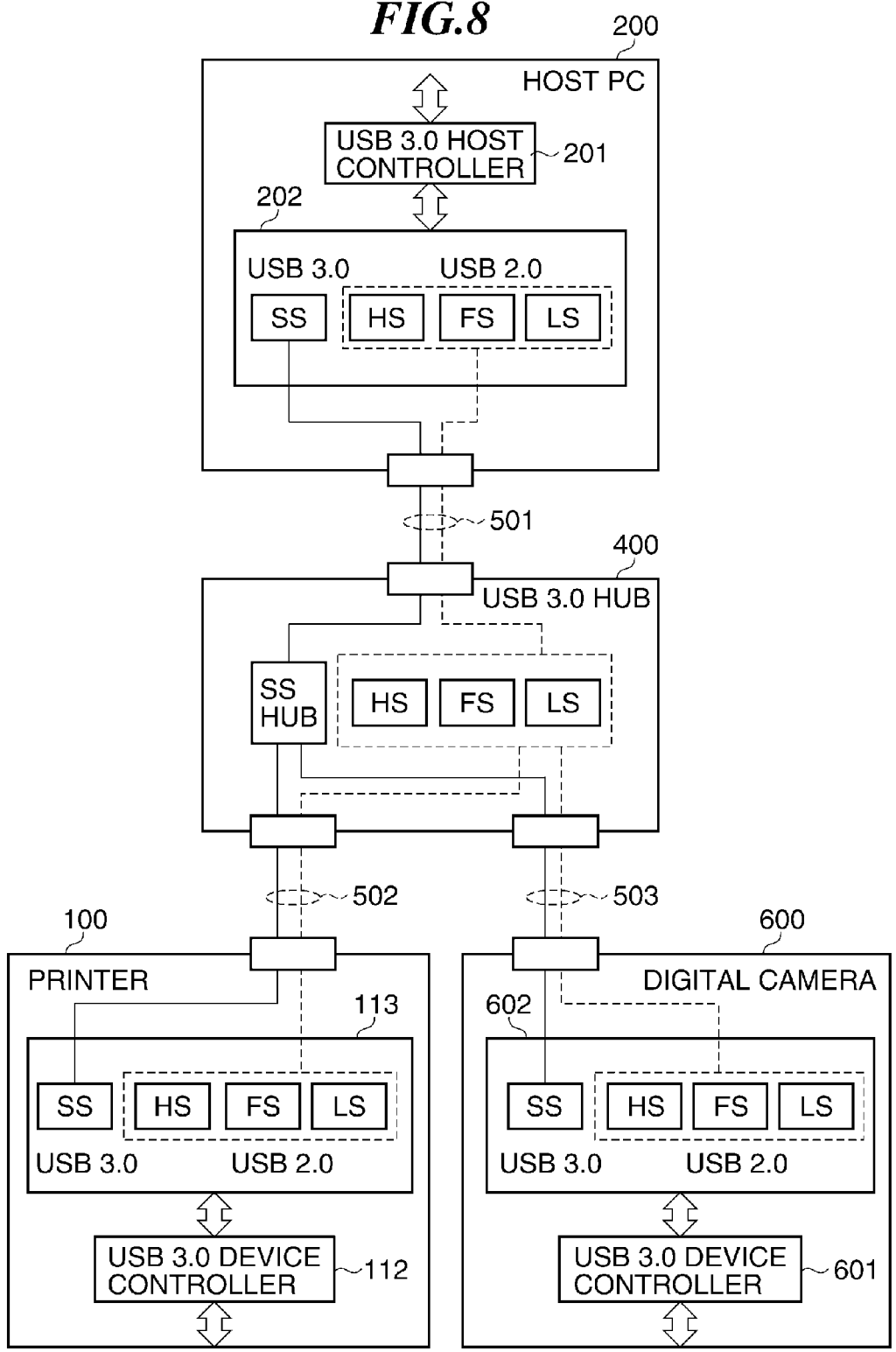
FIG. 8 is a view showing USB I/F connections among a printer as an image forming apparatus according to a second embodiment of the present invention, a hub, a host PC, and a digital camera.

FIG. 8 is a view showing USB I/F connections among the printer 100 as an image forming apparatus according to a second embodiment of the present invention, the hub 400, the host PC 200, and a digital camera 600.

It should be noted that the digital camera 600 (another job processing device) that is a device supporting USB 3.0 is connected to the hub 400 via a USB 3.0 cable 503 instead of the digital camera 300. The configurations of the printer 100, the hub 400, and the host PC 200 are identical to those in the first embodiment.

In FIG. 8, the digital camera 600 has a USB 3.0 device controller 601 and a USB 3.0 PHY (physical interface) 602. The USB 3.0 device controller 601 controls a communication of USB 3.0, and communicates with the host PC 200 as the USB host via the USB 3.0 PHY 602.

Therefore, the connecting configuration by the USB I/F between the hub 400 and the digital camera 600 is the SS, HS, FS, or LS mode. In this case, unlike the first embodiment, there are three types of the connecting configurations between the host PC 200 and the hub 400 according to the connecting configurations of the printer 100 and the digital camera 600. The first type is the SS mode only, the second type is mixture of the SS mode and the HS mode, and the third type is the HS mode only.

Accordingly, the printing system shown in FIG. 8 controls to change the connecting configuration of the printer 100 according to the connecting configuration of the digital camera 600 connected to the host PC 200 so that the printer 100 communicates with stability.

Specifically, when the connecting configuration of the digital camera 600 connected to the host PC 200 is the SS mode, the connection mode of the printer 100 is also changed to the SS mode. This reduces the influence of the crosstalk noise. When the connecting configuration of the digital camera 600 connected to the host PC 200 is the HS mode, the connection mode of the printer 100 is also changed to the HS mode in order to reduce the influence of the crosstalk noise.

Figure 9:
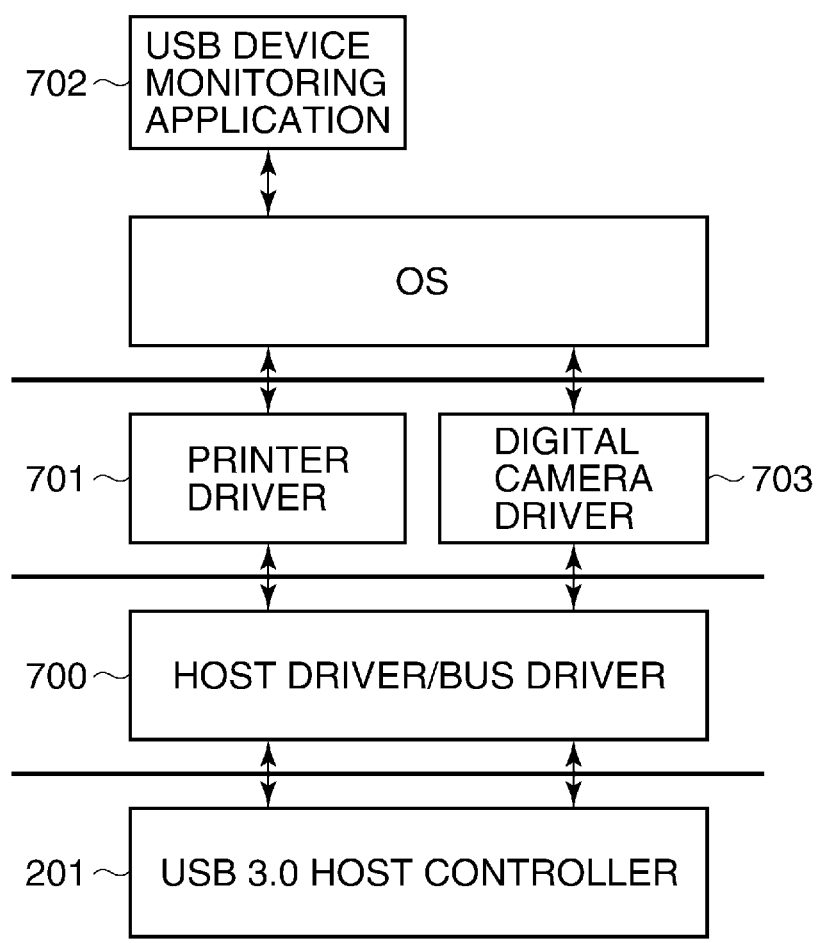
FIG. 9 is a view showing a hierarchical structure of drivers concerning printer control in the host PC shown in FIG. 8.

FIG. 9 is a view showing a hierarchical structure of drivers concerning a control of the printer 100 in the host PC 200 shown in FIG. 8.

As shown in FIG. 9, a host driver/bus driver 700 is installed in the host PC 200. The host driver/bus driver 700 is a device driver in a low order hierarchy that controls the USB 3.0 host controller 201.

The printer driver 701 is a device driver that controls the printer 100, and communicates with the printer 100 via the host driver/bus driver 700. Similarly, a digital camera driver 703 is a device driver that controls the digital camera 600.

However, as mentioned above, the combination of the digital camera 600 and the digital camera driver 703 is an example, and a USB device is not limited to a digital camera. In this case, the host PC 200 has a device driver according to a USB device instead of the digital camera driver 703.

A USB device monitoring application 702 operates as a background service of an OS, and monitors the management information about USB devices, for example. Then, the USB device monitoring application 702 monitors a change of the configuration (for example, connection or disconnection) of a USB device connected to the host PC 200.

When detecting a change of the configuration of the USB device connected to the host PC 200, the USB device monitoring application 702 determines whether the connecting configuration is the SS mode connection, or the HS, FS, or LS mode connection. Further, the USB device monitoring application 702 has the information about SS mode device connection flag corresponding to the determination result concerned, and is provided with a function to notify the printer 100 of the information about the flag via the printer driver 701.

Figure 10:
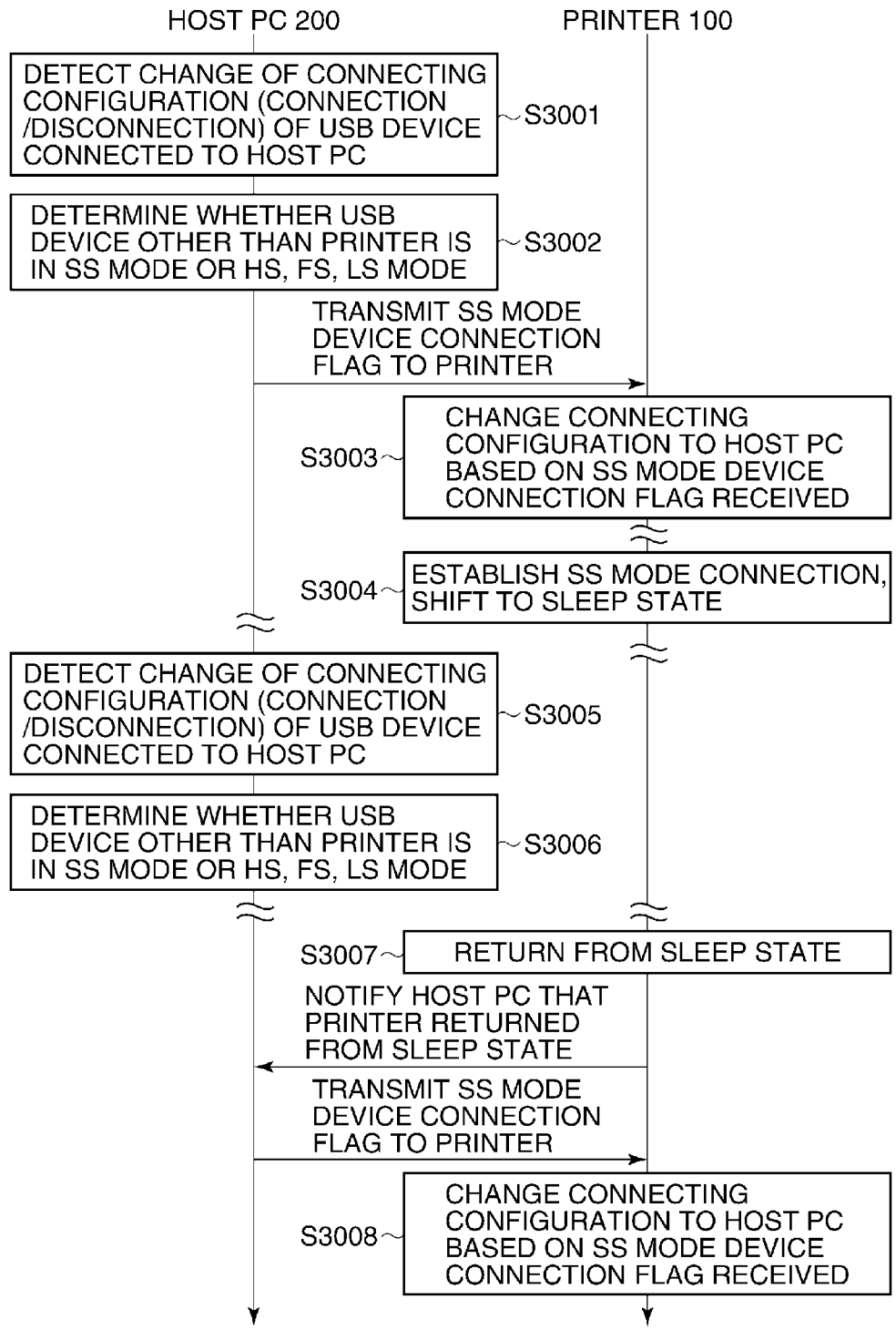
FIG. 10 is a sequential chart showing communications between the host PC and the printer that are shown in FIG. 8, and changes of a working state of the printer.

FIG. 10 is a sequential chart showing communications between the host PC 200 and the printer 100 that are shown in FIG. 8, and changes of a working state of the printer 100. It should be noted that details of operations of the host PC 200 and the printer 100 will be described later.

FIG. 10 shows the operations at the time when another USB device, which is the digital camera 600 in this example, is connected to the host PC 200 to which the printer 100 that is working in the normal state 900 has been connected. The USB device monitoring application 702 of the host PC 200 is monitoring the connecting configuration of a USB device, and detects a change (connection or disconnection) (S3001). Connection of the digital camera 600 is detected in this example.

Next, when the host PC 200 detects the connection of another USB device, the USB device monitoring application 702 determines whether the connecting configuration of the connected USB device (the digital camera 600) is the SS mode connection, or the HS, FS, or LS mode connection (S3002). Then, the USB device monitoring application 702 sets ON/OFF of an SS mode device connection flag based on the determination result concerned, and transmits the flag information concerned to the printer 100 via USB I/F.

When receiving the SS mode device connection flag from the host PC 200, the printer 100 changes the connecting configuration based on the SS mode device connection flag and the current connection mode of the USB I/F of the printer 100 (S3003). Then, as described in the first embodiment, when the condition shifting to the sleep state 901 is satisfied, the printer 100 is shifted to the sleep state 901 from the normal state 900 (S3004).

In this case, the printer 100 is shifted from the normal state 900 to the sleep state 901 in the low power consumption state in the SS mode connection irrespective of the current connecting configuration of the USB I/F.

The USB device monitoring application 702 of the host PC 200 is monitoring the connecting configuration of the USB device (the digital camera 600) like the step S3001 and detects a change (connection or disconnection) (S3005). Then, the USB device monitoring application 702 of the host PC 200 determines whether the connecting configuration of the connected USB device (the digital camera 600) is the SS mode, or the HS, FS, or LS mode connection like the step S3002. Then, according to the determination result concerned, the USB device monitoring application 702 sets ON/OFF of the SS mode device connection flag (S3006).

In this case, since the printer 100 is in the sleep state 901, the host PC 200 does not transmit the flag information to the printer 100, but waits until the printer 100 returns from the sleep state 901.

When receiving a user's instruction to return from the sleep state through the operation unit 106, the CPU 102 of the printer 100 starts a return process from the sleep state 901 (S3007). Then, when returning from the sleep state 901, the printer 100 notifies the host PC 200 of the request to cancel the sleep state in the SS mode connection. Accordingly, in the host PC 200, the printer driver 701 determines that the printer 100 has returned from the sleep state 901, and transmits the SS mode device connection flag to the printer 100.

When receiving the SS mode device connection flag from the host PC 200, the printer 100 changes the connecting configuration based on the SS mode device connection flag and the current connection mode of the USB I/F of the printer 100 (S3008).

Figure 11:
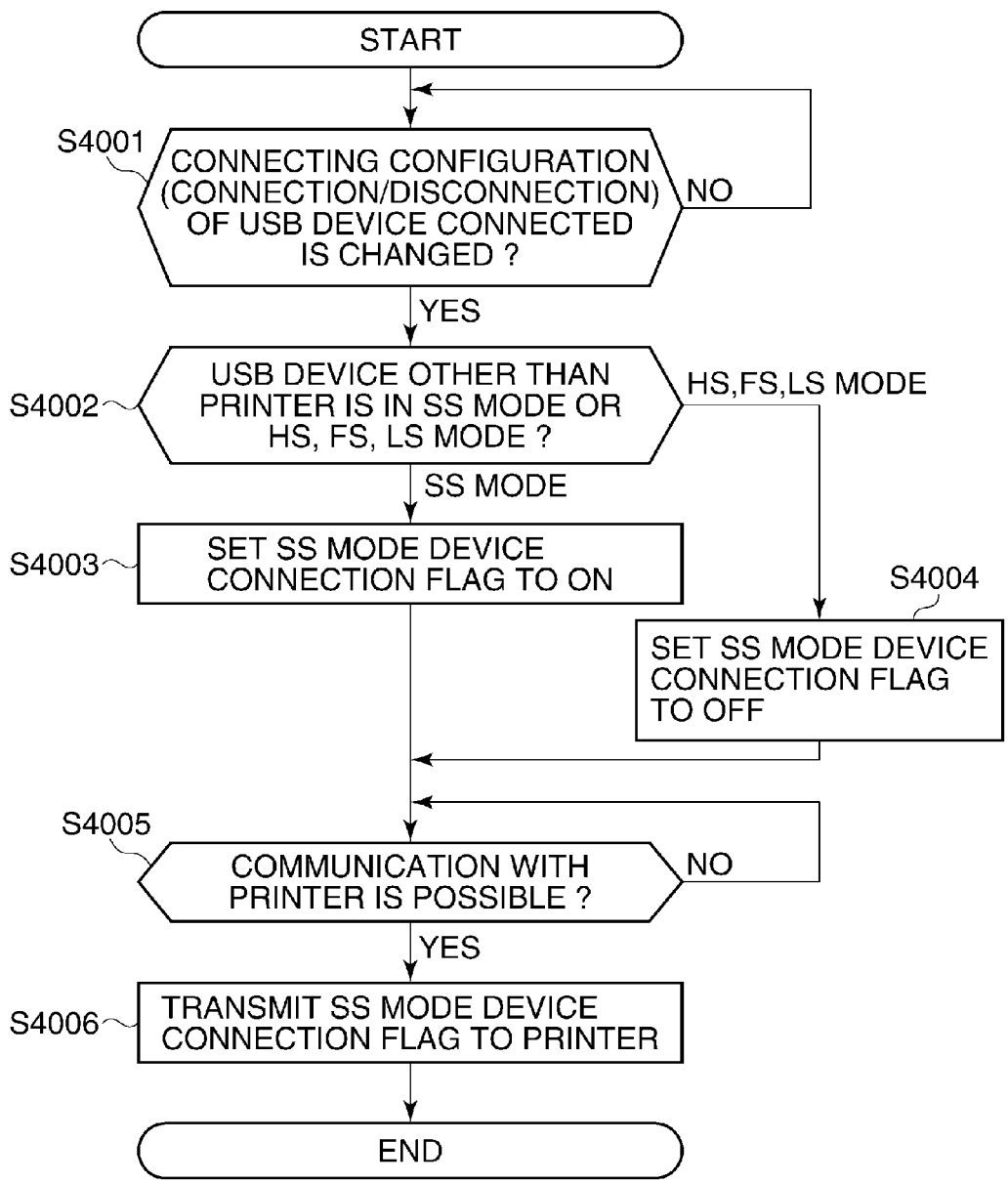
FIG. 11 is a flowchart showing a procedure in which the host PC detects a change of the connecting configuration of the digital camera in FIG. 10, and transmits an SS mode device connection flag according to the detection result concerned to the printer.

FIG. 11 is a flowchart showing a procedure in which the host PC 200 detects a change of the connecting configuration of the digital camera 600 in FIG. 10, and transmits the SS mode device connection flag according to the detection result concerned to the printer 100.

The USB device monitoring application 702 of the host PC 200 is monitoring the connecting configuration of the USB device (the digital camera 600), and detects whether the connecting configuration is changed (connection or disconnection) (step S4001). When a connecting configuration is not changed (NO in the step S4001), the USB device monitoring application 702 continues to monitor.

When a change of the connecting configuration is detected (YES in the step S4001), the USB device monitoring application 702 determines whether the USB device (the digital camera 600) connected to the host PC 200 in addition to the printer 100 has connected in the SS mode, or the HS, FS, or the LS mode (step S4002).

When the connection mode of the USB device (the digital camera 600) is the SS mode (SS mode in the step S4002), the USB device monitoring application 702 sets the SS mode device connection flag to ON (step S4003).

On the other hand, when the connection mode of the USB device (the digital camera 600) is the HS, FS, or LS mode (HS, FS, or LS in the step S4002), the USB device monitoring application 702 sets the SS mode device connection flag to OFF (step S4004).

Next, the USB device monitoring application 702 determines whether communication with the printer 100 is possible according to the connecting condition of the USB I/F between the host PC 200 and the printer 100 (step S4005).

When the communication with the printer 100 is impossible (NO in the step S4005), the USB device monitoring application 702 waits until the communication becomes possible. On the other hand, when the communication with the printer 100 is possible (YES in the step S4005), the USB device monitoring application 702 transmits the SS mode device connection flag (a mode determination result) to the printer 100 (step S4006), and finishes the process.

When the USB I/F is in the low power consumption state in the SS mode connection, the printer 100 is in the sleep state 901 that disables the communication. On the other hand, when the USB I/F is in the normal state in the SS mode connection or the HS mode connection, the printer 100 is possible to communicate.

Figure 12:
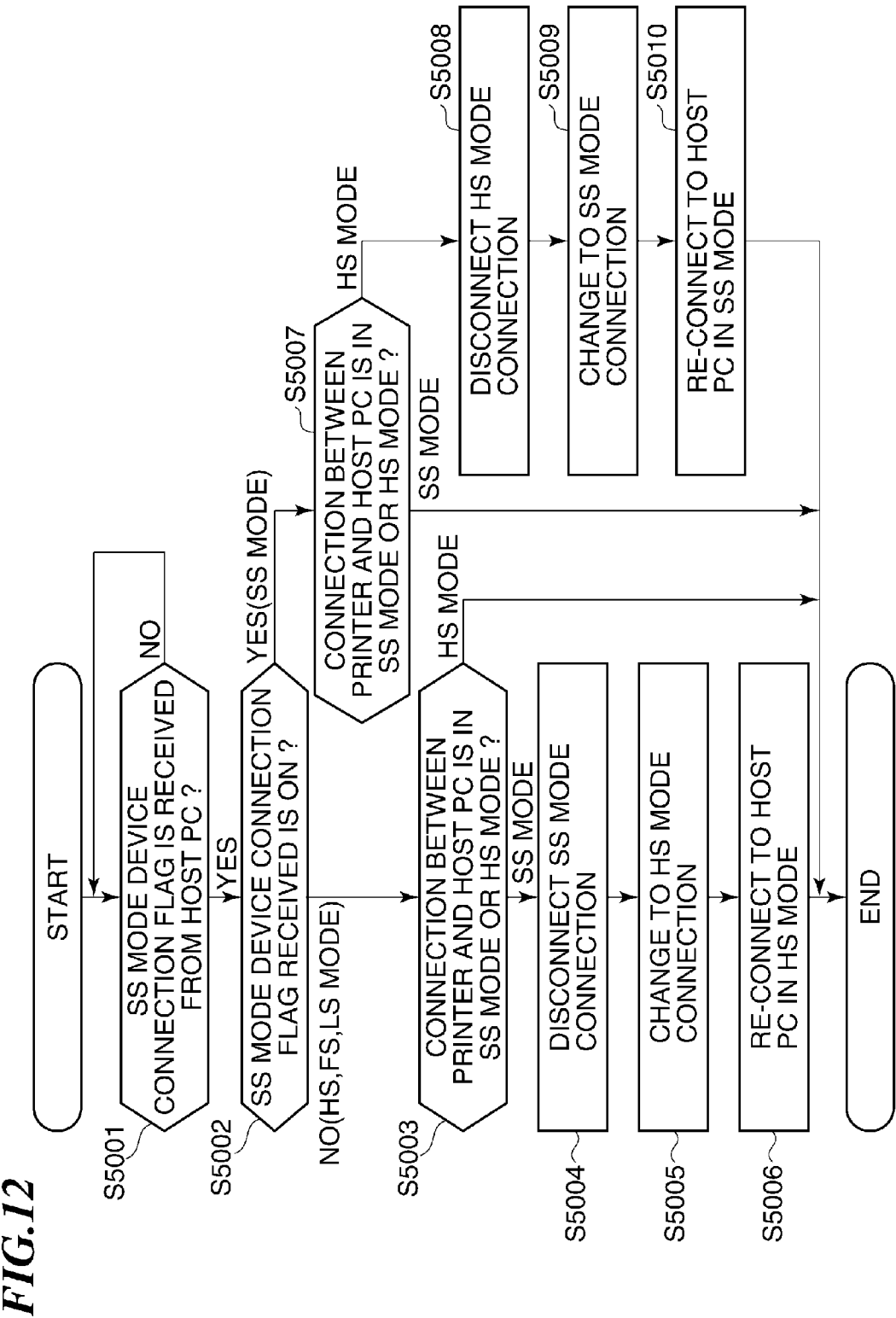
FIG. 12 is a flowchart showing a procedure executed when the printer changes its connecting configuration based on the SS mode device connection flag received from the host PC and the current connecting configuration in the USB I/F in FIG. 10.

FIG. 12 is a flowchart showing a procedure executed when the printer 100 changes its connecting configuration based on the SS mode device connection flag received from the host PC 200 and the current connecting configuration in the USB I/F in FIG. 10.

The CPU 102 of the printer 100 determines whether the SS mode device connection flag (the mode determination result) has been received from the host PC 200, when the communication with the host PC 200 is possible (step S5001). When the SS mode device connection flag is not received (NO in the step S5001), the printer 100 waits until receiving the SS mode device connection flag.

When the SS mode device connection flag is received (YES in the step S5001), the CPU 102 of the printer 100 determines whether the SS mode device connection flag is ON or OFF (step S5002).

When the SS mode device connection flag is OFF (NO in the step S5002), the CPU 102 of the printer 100 determines whether the USB I/F connection is in the SS mode or the HS mode (step S5003). In the case of the SS mode (SS mode in the step S5003), the CPU 102 controls the device controller 112 to disconnect the SS mode connection (step S5004).

Then, the CPU 102 controls the device controller 112 so as to change the USB I/F to the HS mode (step S5003). Then, the USB I/F in the printer 100 establishes the HS mode connection with the host PC 200 (step S5006), and the CPU 102 finishes the process.

In the case of the HS mode (HS mode in the step S5003), the CPU 102 finishes the process. It should be noted that the method for re-connecting in the HS mode is identical to that in the first embodiment.

Thus, when the host PC 200 and the printer 100 are connected in the SS mode and when the digital camera 600 is connected to the host PC 200 in the HS, FS, or LS mode, the printer 100 changes the USB I/F connection to the host PC 200 to the HS mode connection. When the host PC 200 and the printer 100 are connected in the HS mode and when the digital camera 600 is connected to the host PC 200 in the HS mode, the printer 100 keeps the HS mode connection with the host PC 200.

When the SS mode device connection flag is ON (YES in the step S5002), the CPU 102 of the printer 100 determines whether the USB I/F connection is in the SS mode or the HS mode (step S5007). In the case of the SS mode (SS mode in the step S5007), the CPU 102 finishes the process.

In the case of the HS mode (HS mode in the step S5007), the CPU 102 controls the device controller 112 to disconnect the HS mode connection (step S5008). Then, the CPU 102 controls the device controller 112 so as to change the USB I/F to the SS mode (step S5009). Then, the USB I/F in the printer 100 establishes the SS mode connection with the host PC 200 (step S5010), and the CPU 102 finishes the process.

It should be noted that the method for changing from the HS mode to the SS mode and for re-connecting is identical to that in the first embodiment.

Thus, when the host PC 200 and the printer 100 are connected in the HS mode and when the digital camera 600 is connected to the host PC 200 in the SS mode, the printer 100 changes the USB I/F connection to the host PC 200 to the SS mode connection.

On the other hand, when the host PC 200 and the printer 100 are connected in the SS mode and when the digital camera 600 is connected to the host PC 200 in the SS mode, the printer 100 keeps the SS mode connection with the host PC 200.

Thus, in the second embodiment, since the connection mode between the host PC 200 and the printer 100 is changed according to the connection mode between the digital camera 600 and the host PC 200, the crosstalk noise due to the communication speed gap can be reduced.

As is evident from the above-mentioned description, the USB 3.0 controller 112 and the USB 3.0 PHY 113 function as the device interface (USB 3.0 interface) in FIG. 2. The CPU 102 functions as a connect control means and a mode control means. The CPU 102 and the USB 3.0 device controller 112 function as a connection control means.

Although the embodiments of the invention have been described, the present invention is not limited to the above-mentioned embodiments, the present invention includes various modifications as long as the concept of the invention is not deviated.

For example, a computer with which the printer 100 is provided may execute the control method that is defined by the functions of the above-mentioned embodiments. Further, the computer with which the printer 100 is provided may execute a control program that has the functions of the above-mentioned embodiments.

In this case, each of the control method and the control program has a determination step, a connection control step, and a mode control step at least. Each of the control method and the control program may have a receiving step and a connection control step. It should be noted that the control program is recorded into a computer-readable storage medium, for example.

The embodiments are described using the USB 3.0 interface as an example of an interface. However, the interface is not limited to the USB 3.0 interface, and the present invention can be applied to another interface.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

100 Printer
102 CPU
112 USB 3.0 Device Controller
113 USB 3.0 PHY
200 Host PC
300, 600 Digital cameras
400 USB 3.0 Hub
500 USB 2.0 Cable
501, 502, 503 USB 3.0 cables

The invention claimed is:

1. A job processing device that is connectable to a host and processes a job transmitted from the host, wherein the host has a host interface enabling to perform a communication in a first connection mode via a first signal line and another communication in a second connection mode via a second signal line different from the first signal line concurrently, wherein the first connection mode is a mode for communicating in a first communication speed and the second connection mode is a mode for communicating in a second communication speed being slower than the first communication speed, the job processing device comprising:

a device interface enabling to perform the communication in the first connection mode via the first signal line and the another communication in the second connection mode via the second signal line concurrently;

a connection control unit configured to change said device interface from the second connection mode to the first connection mode when said device interface is connected to the host interface in the second connection mode and when an operation mode between the job processing device and the host is shifted from a first operation mode for processing a job to a second operation mode being lower in power consumption than the first operation mode;

a connection establishing unit configured to establish a connection between the job processing device and the host in the first connection mode after changing the connection mode of the device interface by said connection control unit; and a mode control unit configured to shift the operation mode between the job processing device and the host to the second operation mode from the first operation mode after establishing the connection between the job processing device and the host in the first connection mode by said connection establishing unit.

2. The job processing device according to claim 1, wherein the first connection mode has a larger power saving effect than the second connection mode, and the second connection mode is more stable in communication than the first connection mode.

3. The job processing device according to claim 1, wherein the host is further connected to another job processing device having another device interface, said connection control unit changes, when the operation mode is shifted to the first operation mode from the second operation mode, said device interface to the second connection mode from the first connection mode in the case where said device interface is connected to the host interface in the first connection mode and the another device interface is connected to the host interface in the second connection mode, and wherein said mode control unit shifts the operation mode to the first operation mode from the second operation mode after changing the connection mode.

4. The job processing device according to claim 1, wherein said connection control means sets the connection mode of the job processing device itself in the first connection mode when a mode determination result showing a connection mode of another job processing device connected to the host shows the first connection mode, and sets the connection mode of the job processing device itself in the second connection mode when the mode determination result shows the second connection mode.

5. A job processing device that is connectable to a host and processes a job transmitted from the host, wherein the host has a host interface enabling to perform a communication in a first connection mode via a first signal line and another communication in a second connection mode via a second signal line different from the first signal line concurrently, wherein the first connection mode is a mode for communicating in a first communication speed and the second connection mode is a mode for communicating in a second communication speed being slower than the first communication speed, the job processing device comprising:

a device interface enabled to perform the communication in the first connection mode via the first signal line and the another communication in the second connection mode via the second signal line concurrently; and a connection control unit configured to set, in the case where the host is further connected to another job processing apparatus having another device interface enabling to perform the communication via the first signal line and the another communication via the second signal line concurrently and detects a change of the connection mode of the another job processing apparatus, the connection mode of the job processing device itself in the first connection mode when the changed connection mode of the another job processing device is the first connection mode, and set the connection mode of the job processing device itself in the second connection mode when the changed connection mode of the another job processing device is the second connection mode.

6. The job processing device according to claim 5, wherein said connection control unit changes the connection mode between the host interface and said device interface to the first connection mode and re-connects to the host in the case where the connection mode therebetween is the second connection mode when the changed connection mode of the another job processing device is the first connection mode.

7. The job processing device according to claim 5, wherein said connection control unit changes the connection mode between the host interface and said device interface to the second connection mode and re-connects to the host in the case where the connection mode therebetween is the first connection mode when the changed connection mode of the another job processing device is the second connection mode.

8. The job processing device according to claim 1, wherein the host interface and the device interface are USB 3.0 interfaces, the first connection mode is a super speed mode, and the second connection mode is a high speed mode;

a job processing device that is connected to a host, which has a host interface supporting a first connection mode for communicating in a first communication speed and a second connection mode for communicating in a second communication speed being slower than the first communication speed, and processes a job transmitted from the host, comprising:

a device interface that is provided with the first and second connection modes;

a connection control means that changes said device interface from the second connection mode to the first connection mode when said device interface is connected to the host interface in the second connection mode and when an operation mode is shifted from a first operation mode for processing a job to a second operation mode being lower in power consumption than the first operation mode; and a mode control means that shifts the operation mode to the second operation mode from the first operation mode after changing the connection mode.

9. The job processing device according to claim 1, wherein the job is a print job, and the job processing device is an image forming apparatus that forms an image according to the print job;

a job processing device that is connected to a host, which has a host interface supporting a first connection mode for communicating in a first communication speed and a second connection mode for communicating in a second communication speed being slower than the first communication speed, and processes a job transmitted from the host, comprising:

a device interface that is provided with the first and second connection modes;

a connection control means that changes said device interface from the second connection mode to the first connection mode when said device interface is connected to the host interface in the second connection mode and when an operation mode is shifted from a first operation mode for processing a job to a second operation mode being lower in power consumption than the first operation mode; and a mode control means that shifts the operation mode to the second operation mode from the first operation mode after changing the connection mode.

10. A control method for a job processing device that is connectable to a host and processes a job transmitted from the host, wherein the host has a host interface enabled to perform a communication in a first connection mode via a first signal line and another communication in a second connection mode via a second signal line different from the first signal line concurrently, wherein the first connection mode is a mode for communicating in a first communication speed and the second connection mode is a mode for communicating in a second communication speed being slower than the first communication speed, and has a device interface that is provided with the first and second connection modes, the control method comprising:

a determination step of determining whether the device interface is connected to the host interface in the second connection mode, when an operation mode between the job processing device and the host is shifted from a first operation mode for processing a job to a second operation mode being lower in power consumption than the first operation mode;

a connection control step of changing the connection mode of the device interface to the first connection mode from the second connection mode when it is determined that the device interface is connected to the host interface in the second connection mode in said determination step;

a connection establishing step of establishing a connection between the job processing device and the host in the first connection mode after changing the connection mode of the device interface by said connection control step; and a mode control step of shifting the operation mode between the job processing device and the host to the second operation mode between the job processing device and the host from the first operation mode after establishing the connection between the job processing device and the host in the first connection mode by said connection establishing step.

11. A control method for a job processing device that is connectable to a host and processes a job transmitted from the host, wherein the host has a host interface enabled to perform a communication in a first connection mode via a first signal line and another communication in a second connection mode via a second signal line different from the first signal line concurrently, wherein the first connection mode is a mode for communicating in a first communication speed and the second connection mode is a mode for communicating in a second communication speed being slower than the first communication speed, and has a device interface that is provided with the first and second connection modes, the control method comprising:

a receiving step of receiving a mode determination result showing a connection mode of another job processing device connected to the host determined by the host;

a connection control step of setting a connection mode of the job processing device itself in the first connection mode when the mode determination result shows the first connection mode, and setting the connection mode of the job processing device itself in the second connection mode when the mode determination result shows the second connection mode; and a connection establishing step of establishing a connection between the job processing device and the host in the first connection mode after changing the connection mode of the device interface by said connection control step.

12. A control program causing a computer to function as a job processing device that is connectable to a host and processes a job transmitted from the host, wherein the host has a host interface enabled to perform a communication in a first connection mode via a first signal line and another communication in a second connection mode via a second signal line different from the first signal line concurrently, wherein the first connection mode is a mode for communicating in a first communication speed and the second connection mode is a mode for communicating in a second communication speed being slower than the first communication speed, and has a device interface that is provided with the first and second connection modes, the control program comprising:

a determination step of determining whether the device interface is connected to the host interface in the second connection mode, when an operation mode between the job processing device and the host is shifted from a first operation mode for processing a job to a second operation mode being lower in power consumption than the first operation mode;

a connection control step of changing the connection mode of the device interface to the first connection mode from the second connection mode when it is determined that the device interface is connected to the host interface in the second connection mode in said determination step;

a connection establishing step of establishing a connection between the job processing device and the host in the first connection mode after changing the connection mode of the device interface by said connection control step; and a mode control step of shifting the operation mode between the job processing device and the host to the second operation mode between the job processing device and the host from the first operation mode after establishing the connection between the job processing device and the host in the first connection mode by said connection establishing step.

13. A control program causing a computer to function as a job processing device that is connectable to a host and processes a job transmitted from the host, wherein the host has a host interface enabled to perform a communication in a first connection mode via a first signal line and another communication in a second connection mode via a second signal line different from the first signal line concurrently, wherein the first connection mode is a mode for communicating in a first communication speed and the second connection mode is a mode for communicating in a second communication speed being slower than the first communication speed, and has a device interface that is provided with the first and second connection modes, the control program comprising:

a receiving step of receiving a mode determination result showing a connection mode of another job processing device connected to the host determined by the host;

a connection control step of setting a connection mode of the job processing device itself in the first connection mode when the mode determination result shows the first connection mode, and setting the connection mode of the job processing device itself in the second connection mode when the mode determination result shows the second connection mode; and a connection establishing step of establishing a connection between the job processing device and the host in the first connection mode after changing the connection mode of the device interface by said connection control step.

14. The job processing device according to claim 5, wherein the host interface and the device interface are USB 3.0 interfaces, the first connection mode is a super speed mode, and the second connection mode is a high speed mode;

a job processing device that is connected to a host, which has a host interface supporting a first connection mode for communicating in a first communication speed and a second connection mode for communicating in a second communication speed being slower than the first communication speed, and processes a job transmitted from the host, comprising:

a device interface that is provided with the first and second connection modes;

a connection control means that changes said device interface from the second connection mode to the first connection mode when said device interface is connected to the host interface in the second connection mode and when an operation mode is shifted from a first operation mode for processing a job to a second operation mode being lower in power consumption than the first operation mode; and a mode control means that shifts the operation mode to the second operation mode from the first operation mode after changing the connection mode.

15. The job processing device according to claim 5, wherein the job is a print job, and the job processing device is an image forming apparatus that forms an image according to the print job;

a job processing device that is connected to a host, which has a host interface supporting a first connection mode for communicating in a first communication speed and a second connection mode for communicating in a second communication speed being slower than the first communication speed, and processes a job transmitted from the host, comprising:

a device interface that is provided with the first and second connection modes;

a connection control means that changes said device interface from the second connection mode to the first connection mode when said device interface is connected to the host interface in the second connection mode and when an operation mode is shifted from a first operation mode for processing a job to a second operation mode being lower in power consumption than the first operation mode; and a mode control means that shifts the operation mode to the second operation mode from the first operation mode after changing the connection mode.

\* \* \* \* \*